(12) United States Patent
Richley (10) Patent No.: US 6,485,280 B1
(45) Date of Patent: Nov. 26, 2002

(54) METHODS AND APPARATUS FOR FABRICATING BICHROMAL ELEMENTS

(75) Inventor: Edward A. Richley, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/360,088

(22) Filed: Jul. 23, 1999

(51) Int. Cl.⁷ ................................................ B29B 9/10
(52) U.S. Cl. ............... 425/8; 425/174.4; 425/174.8 SE; 264/8; 264/10
(58) Field of Search ........................... 264/10, 5, 8, 12, 264/13; 425/6, 8, 174.4, 174.8 E (56) References Cited

U.S. PATENT DOCUMENTS

| | | | |
|---|---|---|---|
| 2,600,963 A | 6/1952 | Bland | 49/58 |
| 2,794,301 A | 6/1957 | Law et al. | 49/84 |
| 2,950,985 A | 8/1960 | Duval d'Adrian | 117/33 |
| 2,965,921 A | 12/1960 | Bland | 18/2.5 |
| 2,980,547 A | 4/1961 | Duval d'Adrian | 106/47 |
| 3,150,947 A | 9/1964 | Bland | 65/21 |
| 3,243,273 A | 3/1966 | Bland | 65/21 |
| 3,310,391 A | 3/1967 | Law | 65/21 |
| 3,406,363 A | 10/1968 | Tate | 335/302 |
| 3,615,993 A | 10/1971 | French | 156/155 |
| 3,617,333 A | 11/1971 | Brown | 117/35 R |
| 4,253,909 A | 3/1981 | Lee | 156/654 |
| 4,256,677 A | 3/1981 | Lee | 264/8 |
| 4,303,433 A | * 12/1981 | Torobin | 425/8 |
| 4,810,431 A | 3/1989 | Leidner | 264/15 |
| 5,262,098 A | 11/1993 | Crowley et al. | 264/8 |
| 5,344,594 A | 9/1994 | Sheridon | 264/4.1 |
| 5,717,514 A | 2/1998 | Sheridon | 359/296 |
| 5,900,192 A | * 5/1999 | Richley | 264/8 |

FOREIGN PATENT DOCUMENTS

EP    0 446 134 A1    3/1991

OTHER PUBLICATIONS

Balachandran et al., The Dispersion of Liquids Using Centrifugal and Electrostatic Forces, IEEE Transactions on Industry Applications, vol. 1A–20, No. 3, May/Jun. 1984, pp. 682–686.

Bals, Design of Rotary Atomizers, Proc. 4$^{th}$ Int. agric. Aviat. Congr. (Kingdom, 1969), pp. 156–165.

Chanaud et al., Observations of Oscillatory Radial Flow Between a Fixed Disk and a Free Disk, The Journal of the Acoustical Society of America, vol. 47, No. 5 (Part 2), 1970, pp. 1471–1472.

(List continued on next page.)

Primary Examiner—Jan H. Silbaugh
Assistant Examiner—Thu Khanh T. Nguyen
(74) Attorney, Agent, or Firm—Nola Mae McBain (57) ABSTRACT

An apparatus for fabricating bichromal elements comprising a separator member having a central rotating point, the separator member having first and second spaced apart, opposed surfaces with an edge region in contact with both of said opposed surfaces. The spacing between the opposed surfaces varies with the distance outwardly from the central rotating point such that the spacing is the largest at the central rotating point and the spacing decreases outwards from the central rotating point and the spacing is a minimum at the edge region. Further each of the opposed surfaces has a substantially annular cup spaced apart from and substantially surrounding the central rotating point. The apparatus for fabricating bichromal elements also includes apparatus for dispensing first and second differently colored hardenable liquids in the cups of the first and second surfaces, respectively, and an apparatus for substantially uniformly spreading the liquid material in the annular cups located in the first and second surfaces and for substantially uniformly spreading the liquid material from the cups over the first and second surfaces toward said edge region to form a reservoir of liquid material outboard of said edge region, and for forming ligaments from said reservoir.

42 Claims, 5 Drawing Sheets

OTHER PUBLICATIONS

Dunskiy et al., "Satellite Droplets" Forming During Atomization of Liquids by a Rotating Disk, Fluid Mechanics–Soviet Research, vol. 1, No. 1, 1972, pp. 110–113.

Eisenklam, on Ligament Formation from Spinning Discs and Cups, Chemical Engineering Science, vol. 19, 1964, pp. 693–694.

Forcada et al., The Flow of Thin Viscous Liquid Films on Rotating Disks, Journal of Colloid and Interface Science 160, 1993, pp. 218–225.

Frost, Rotary Atomization, Symposium on Controlled Drop Application, Apr. 1978, pp. 7–21.

Gross, Investigation of Whirl in Externally Pressurized Air–Lubricated Journal Bearings, Transactions of the ASME, Journal of Basic Engineering, Mar. 1962, pp. 133–138.

Hinze et al., Atomization of Liquids by Means of a Rotating Cup, Journal of Applied Mechanics, Jun. 1950, pp. 145–153.

Lippold et al., A Rotary Atomizer for Air Humidification, Translated from Luft–und Kältetechnik, pp. 69–72, Feb. 1972, Translated by Berkeley Scientific Translation Service.

Povarov et al., Interaction of Drops with Boundary Layer on Rotating Surface, Translated from Inzhenerno–Fizicheskii Zhurnal, vol. 31, No. 6, Mar. 17, 1975, pp. 1068–1073.

Stowell, Pneumatic Hammer in a Gas Lubricated Externally Pressurized Annular Thrust Bearing, Transactions of the ASME, Journal of Lubrication Technology, Oct. 1971, pp. 498–503.

* cited by examiner

METHODS AND APPARATUS FOR FABRICATING BICHROMAL ELEMENTS

INCORPORATION BY REFERENCE

The following patents and/or patent applications are herein incorporated by reference:

U.S. Pat. No. 5,262,098, titled "Method And Apparatus For Fabricating Bichromal Balls For A Twisting Ball Display", by Crowley et al. issued on Nov. 16, 1993, U.S. Pat. No. 4,126,854, titled "Twisting Ball Panel Display", by Sheridon issued on Nov. 21, 1978, U.S. Pat. No. 5,825,529, titled "Gyricon Display With No Elastomer Substrate", by Crowley issued on Oct. 20, 1998, U.S. Pat. No. 5,262,098, titled "Method And Apparatus For Fabricating Bichromal Balls For A Twisting Ball Display" by Crowley et al. issued Nov. 16, 1993, U.S. patent application Ser. No. 09/037,767, titled "Charge Retention Islands For Electric Paper And Applications Thereof" by Howard et al. filed on Mar. 10, 1998, and assigned to the same assignee.

U.S. patent application Ser. No. 08/716,672, titled "Twisting-Cylinder Display" by Sheridon et al. filed on Sep. 13, 1996, and assigned to the same assignee.

BACKGROUND

This invention relates generally to forming bichromal elements to be used in a gyricon display, and more specifically provides a new method and apparatus for supplying hardenable liquid to the surfaces of a spinning disk configuration used to fabricate the bichromal elements.

Gyricon sheet material, also known as electric paper, is known in the art. U.S. Pat. No. 4,126,854, titled "Twisting Ball Panel Display", by Sheridon, issued on Nov. 21, 1978, and incorporated by reference hereinabove describes how to make and use gyricon sheet material containing bichromal spherical elements. In essence, U.S. Pat. No. 4,126,854 describes a thin transparent sheet having many of the attributes of paper. That is, the sheet is lightweight, flexible, can be easily read in ambient light, and retains displayed information for long periods of time with needing to refresh the displayed information.

The sheet comprises an elastomeric host material which is heavily loaded with substantially hemispherically colored bichromal spherical elements. Each hemisphere is differently colored, such as black and white, red and white or any other combination of colors desired. Each element is further contained within its own substantially spherical cavity in a dielectric liquid. When an electric field is placed across the sheet material the elements rotate such that they line up with the electric field. The elements can therefore be rotated to display either colored hemisphere or even to display a portion of both hemispheres.

U.S. Pat. No. 5,825,529, titled "Gyricon Display With No Elastomer Substrate", by Crowley, issued on Oct. 20, 1998, and incorporated by reference hereinabove describes another embodiment of gyricon material. As described in U.S. Pat. No. 5,825,529, the spherical elements are closely packed in a stable arrangement, such as a hexagonally packed monolayer directly in the dielectric liquid. The elements in the dielectric fluid are then sandwiched between two retaining members and sealed in. In operation, this embodiment works as described above.

U.S. patent application Ser. No. 09/037,767, titled "Charge Retention Islands For Electric Paper And Applications Thereof" by Howard et al. filed on Mar. 10, 1998 and incorporated be reference hereinabove describes yet another embodiment of gyricon sheet material. In U.S. patent application Ser. No. 09/037,767 a sheet material is described similar in nature to the sheet material described in U.S. Pat. No. 4,126,854. However, in U.S. patent application Ser. No. 09/037,767 several different populations of bichromal elements are used to implement grey scale, highlight color and additive full color. The different populations of the bichromal elements are disposed in addressable subpixel areas.

U.S. patent application Ser. No. 08/716,672, titled "Twisting-Cylinder Display" by Sheridon et al. describes yet another embodiment of a display utilizing rotating bichromal elements. In U.S. patent application Ser. No. 08/716,672 a display is described which uses substantially cylindrical elements. As in the earlier described embodiments, the cylinders reside in a dielectric liquid and their orientation can be changed by applying an electric field.

What each of these embodiments have in common is that all use a rotating bichromal element. Many methods are known in the art for forming bichromal elements, for instance, monochromatic elements may first be formed and then coated from one direction in a vacuum evaporation chamber. U.S. Pat. No. 5,262,098, titled "Method And Apparatus For Fabricating Bichromal Balls For A Twisting Ball Display" by Crowley et al. issued Nov. 16, 1993, and incorporated by reference hereinabove describes a method using a spinning disk technique. In essence, a hardenable liquid is fed to each of the surfaces of a spinning disk. The hardenable liquids meet at the edge of the disk and form a bichromal ligament that is propelled away from the disk. The distal end of the bichromal ligament breaks up into droplets forming bichromal spheres. In a variation on this method described in U.S. patent application Ser. No. 08/716,672, high-viscosity hardenable liquids are used to create bichromal cylinders.

In both cases, two different hardenable liquids must be supplied to the spinning disk, one to each of the opposed surfaces. U.S. Pat. No. 5,262,098 describes a feed mechanism which uses a rotatable dispensing assembly with two liquid metering members with the rotatable disk supported therebetween. The lower metering member includes a spindle portion, mountable upon and rotatable by a motor, a coupling extension having a central bore for receiving liquid, a number of radially extending, upwardly angled liquid supply ports, a circular reservoir, and a circular metering lip for delivering a thin layer of liquid to the lower surface of the spinning disk. The upper metering member encircles the coupling extension and is secured in place by a locking nut. The upper metering member an inner groove communicating with a number of radially extending, downwardly angled liquid supply ports which in turn, communicate with a circular reservoir and a circular metering lip for delivering a thin layer of liquid to the upper surface of the disk. A stationary liquid delivery assembly is seated upon the rotatable dispensing assembly for delivering the two liquids to their respective surfaces of the disk.

While the feed mechanism is quite satisfactory for delivering the two liquids to the their respective surfaces of the disk, during periods of extended use, the system tends to clog preventing proper dispensing of the liquids to their respective surfaces. The present invention provides an improved apparatus and method of use which exhibits reduced clogging when used for extended periods of time.

Further advantages of the invention will become apparent as the following description proceeds.

SUMMARY OF THE INVENTION

Briefly stated and in accordance with the present invention, there is provided an apparatus for fabricating bichromal elements comprising a separator member having a central rotating point, the separator member having first and second spaced apart, opposed surfaces with an edge region in contact with both of said opposed surfaces. The spacing between the opposed surfaces varies with the distance outwardly from the central rotating point such that the spacing is the largest at the central rotating point and the spacing decreases outwards from the central rotating point and the spacing is a minimum at the edge region. Further, each of the opposed surfaces has a substantially annular cup spaced apart from and substantially surrounding the central rotating point. The apparatus for fabricating bichromal elements also includes apparatus for dispensing first and second differently colored hardenable liquids in the cups of the first and second surfaces, respectively, and an apparatus for substantially uniformly spreading the liquid material in the annular cups located in the first and second surfaces and for substantially uniformly spreading the liquid material from the cups over the first and second surfaces toward said edge region to form a reservoir of liquid material outboard of said edge region, and for forming ligaments from said reservoir.

While the present invention will be described in connection with a preferred embodiment and/or method of use, it will be understood that it is not intended to limit the invention to that embodiment and procedure. On the contrary, it is intended to cover all alternatives, modifications and equivalents as may be included within the spirit and scope of the invention as defined by the appended claims.

Alpha-Numeric List of the Elements

C centerline
d annular cup depth
$t_1$ body thickness
$t_2$ nose thickness
w annular cup width
10 spinner
12 rotating shaft
14 separator member
16 body
18 nose
20 annular cup
22 stationary shroud
24 rotating shroud
26 rotating shroud support member
28 liquid feed nozzle
30 liquid feed nozzle
32 heat source
34 surface
36 surface
38 edge region
40 hardenable liquid
42 hardenable liquid
44 free jet

DETAILED DESCRIPTION OF THE INVENTION

Figure 1:
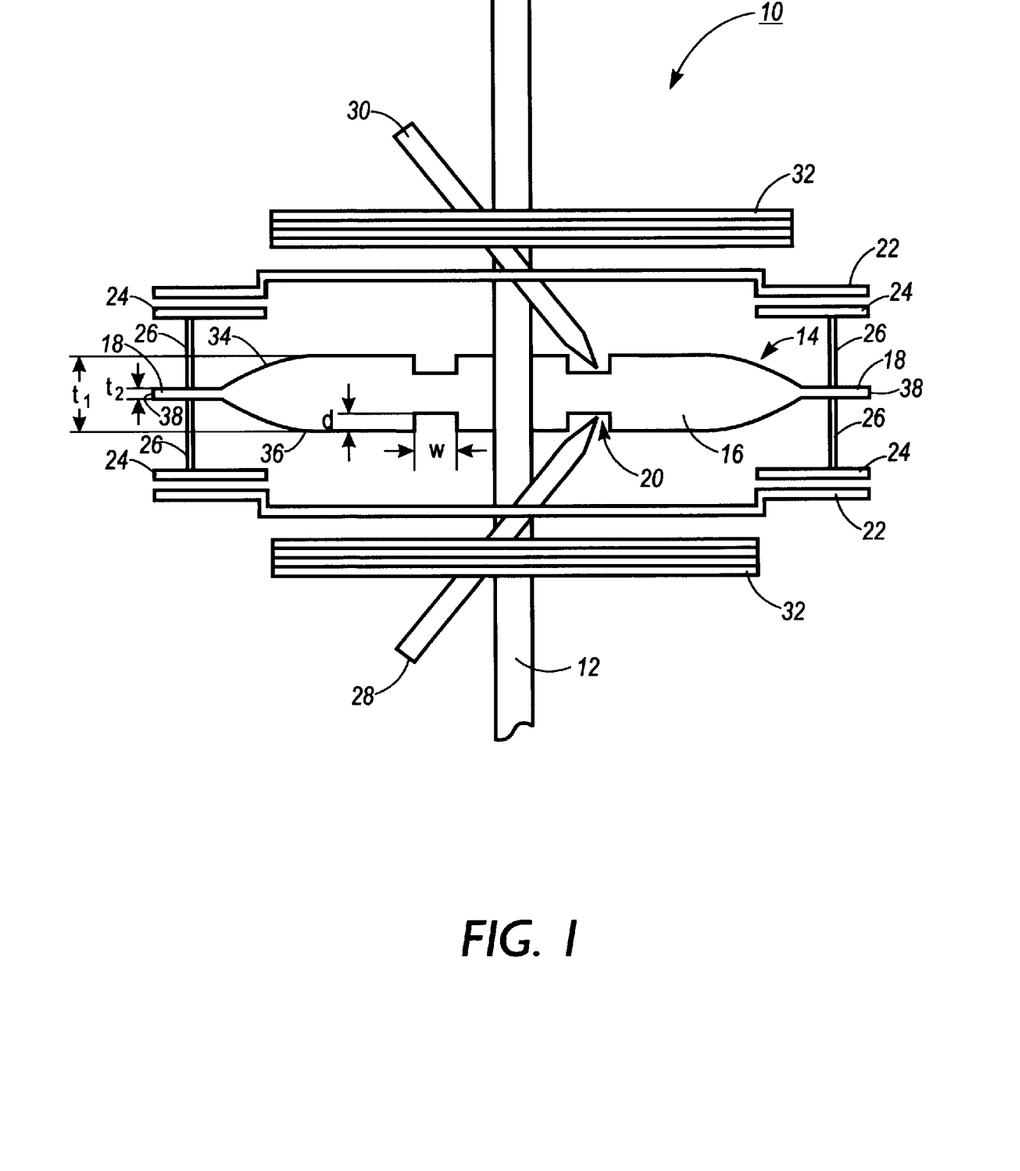
FIG. 1 is a side view of a spinner according to the present invention.

Turning now to FIG. 1, a side view of a spinner 10 is shown. A separator member 14 is attached to a rotating shaft 12. The rotating shaft 12 can be driven by any suitable motor (not shown). The separator member 14 is symmetric, have a thicker body 16 portion adjacent the rotating shaft 12 which narrows down into a thinner nose 18 portion. The thickness of the body 16 is shown as body thickness $t_1$ and the thickness of the nose as nose thickness $t_2$. The separator member 14 has two opposed surfaces 34, 36 both in contact with an edge region 38. Contained in each of the opposed surfaces 34, 36 is an annular cup 20, having an annular cup depth d and an annular cup width w. Liquid is fed into the annular cups 20 by liquid feed nozzles 28, 30. Attached to separator member 14 via rotating shroud support members 26 are two rotating shrouds 24, one adjacent to but not touching each of the surfaces 34, 36. In addition to the rotating shrouds 24 there are two stationary shrouds 22, one outside of each of the rotating shrouds. Outside of each of the stationary shrouds 22 are two heat sources.

Figure 2:
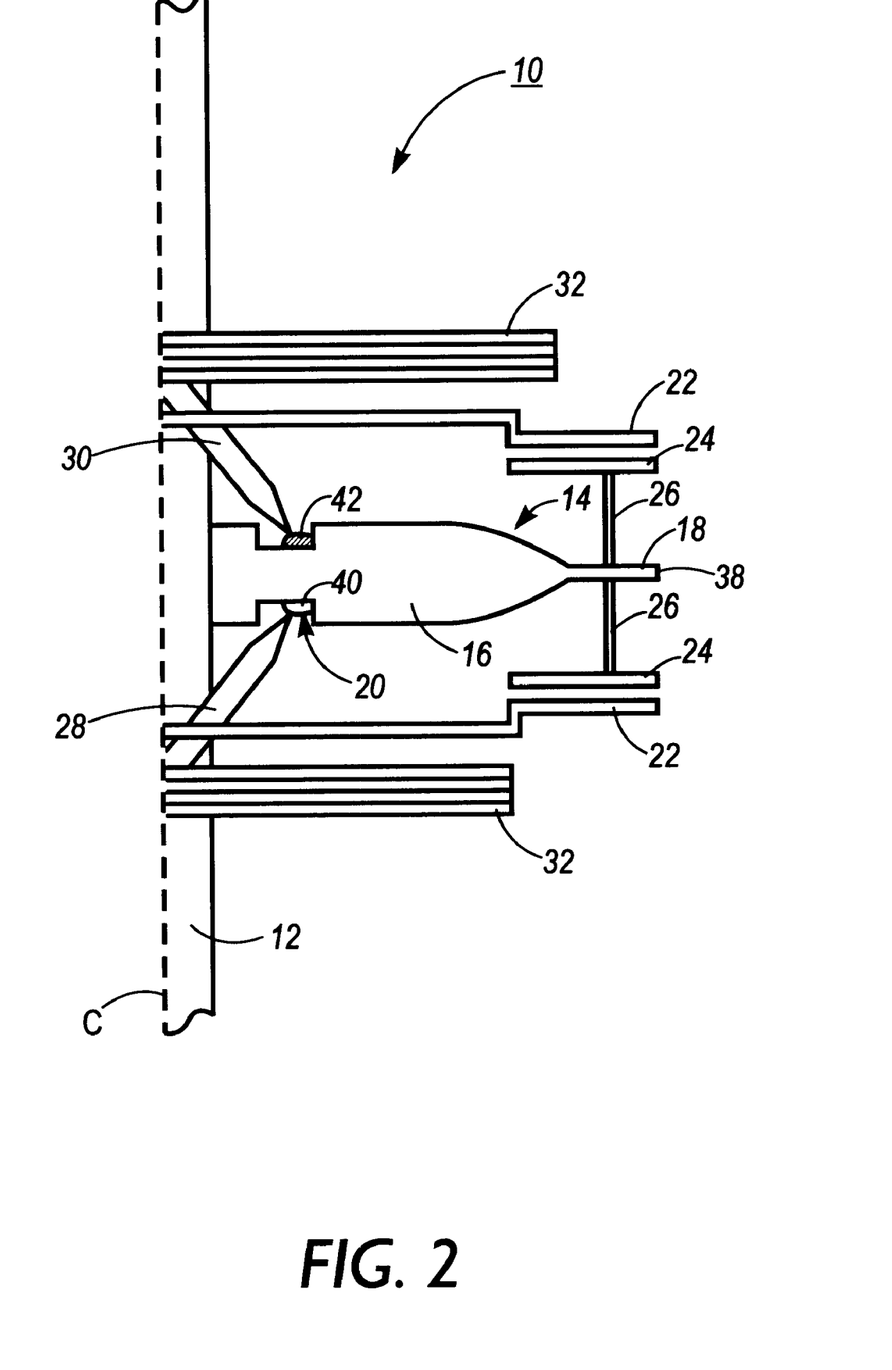
FIG. 2 is an enlargement of one-half of the spinner shown in FIG. 1 illustrating the delivery of a hardenable liquid material to the spinner.
Figure 3:
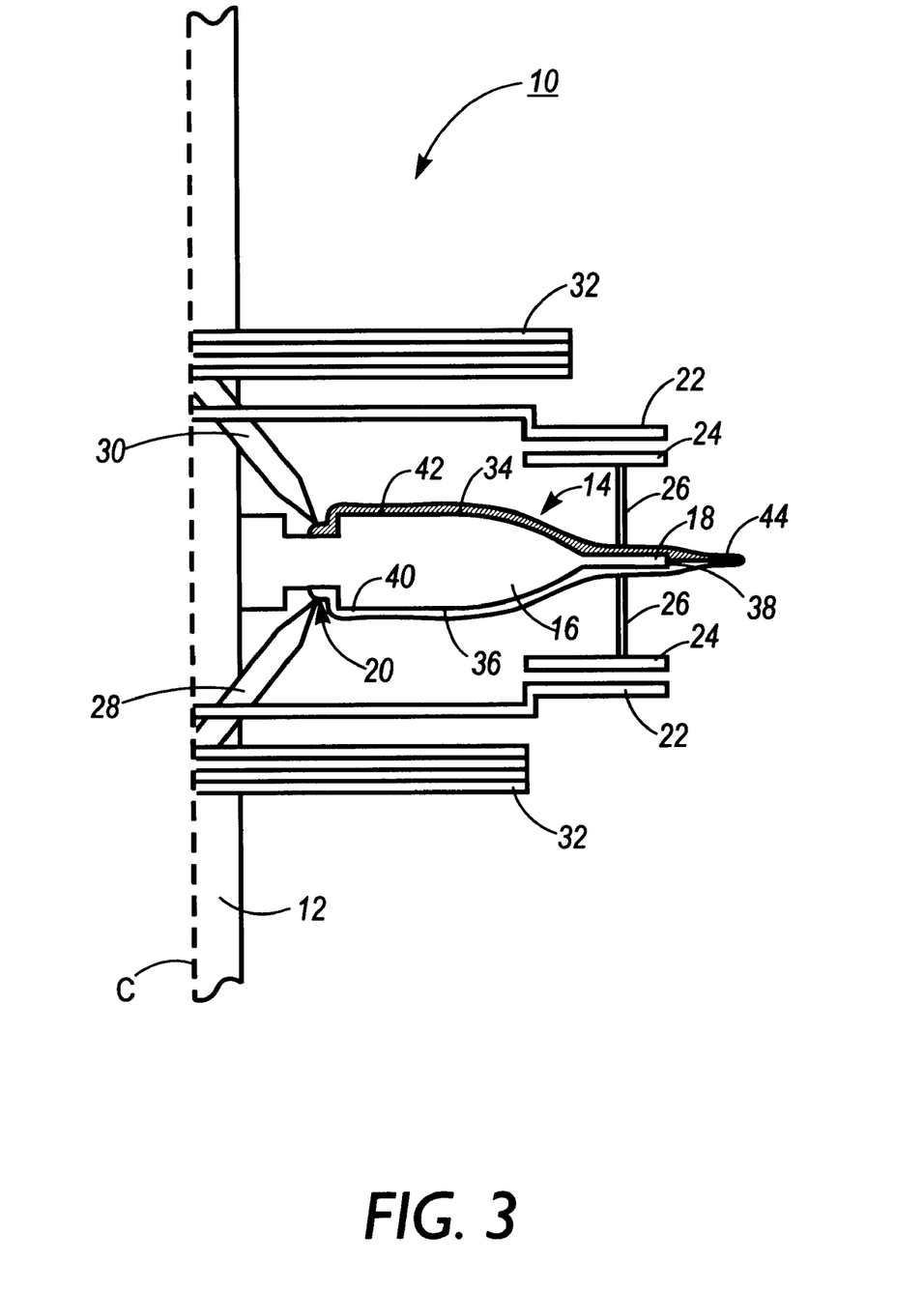
FIG. 3 is an enlargement of one-half of the spinner shown in FIG. 1 illustrating further the process of using the spinner.

For illustrative purposes only, FIGS. 2 and 3 shown only one half of the spinner 10, as cut through the rotating shaft on centerline C. FIGS. 2 and 3 illustrate the operating characteristics of the spinner 10. Two streams of a hardenable liquid material 40, 42 are dispensed through liquid feed nozzles 28, 30 whose ends direct the hardenable liquid material 40, 42 into an associated annular cup 20 on each of the surfaces 34, 36 as shown in FIG. 2. The hardenable liquid material 40, 42 disperses within the cup 20 and then begins to flow out of the cup 20 and onto the surfaces 34, 36 of the separator member 14. The hardenable liquid material 40, 42 then flows to the ends of the surfaces 34, 36 and over the edge 38 where they form an outboard reservoir of liquid material. By controlling the dispensing rate of each stream into the annular cup 20 relative to the surface 34, 36 distance over which each must flow, it is possible to substantially equalize the flow rate at which the hardenable liquid materials 40, 42 reach the edge region 38, thus enabling the reservoir to include substantially equal amounts of each of the hardenable liquid materials 40, 42. It should be noted that the hardenable liquid materials 40, 42 adhere to each other but do not intermix, so that the reservoir includes side-by-side portions of each hardenable liquid material 40, 42. If the flow rates of the hardenable liquid materials 40, 42 are not substantially equal then although a reservoir will still be formed it will not include substantially equal amounts of each of the hardenable liquid materials 40, 42. The resulting bichromal elements will not have roughly hemispheric portions of each of the hardenable materials but one material will comprise a portion larger than hemispheric while the other material will comprise a portion smaller than hemispheric. When the rate of flow of the liquids away from the edge 38, into the host fluid (air is shown), is great enough, free jet 44 are formed as shown in FIG. 3.

Figure 4:
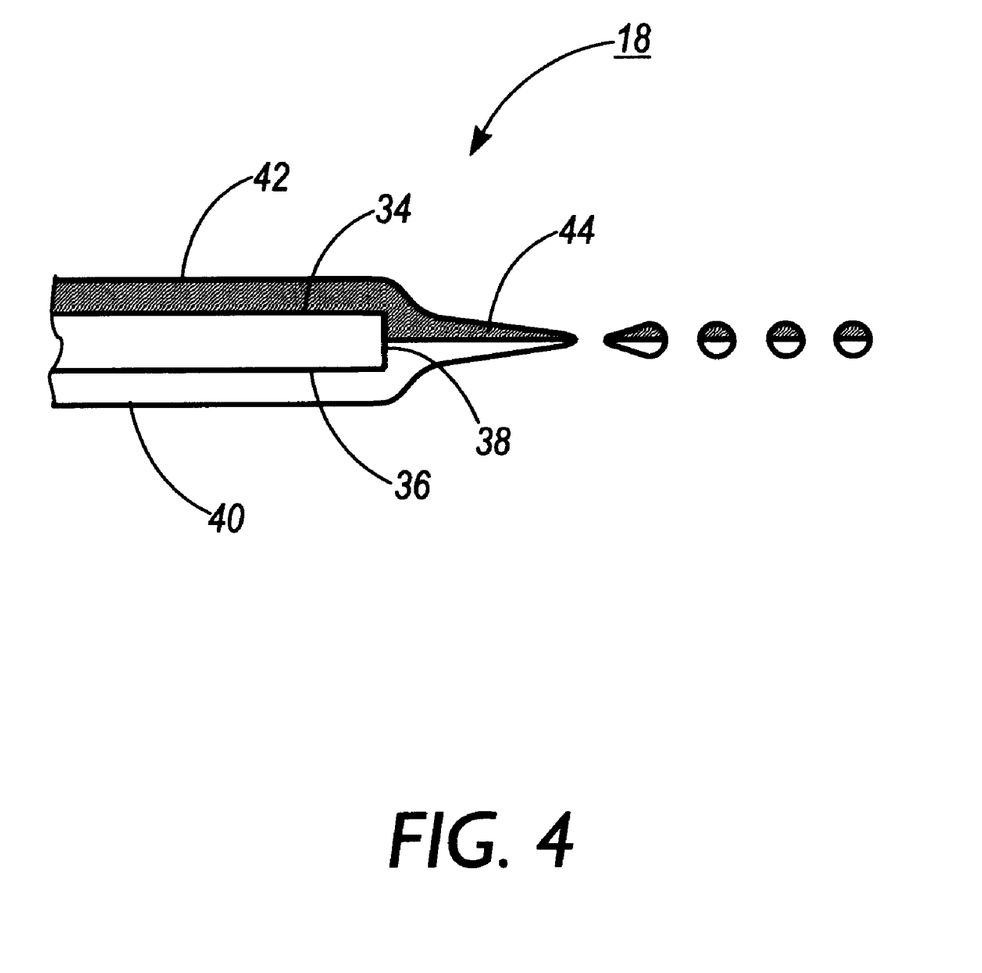
FIG. 4 is an enlargement of an edge region of the spinner shown in FIG. 1 illustrating the formation of spheres.

Each jet 44 comprises a ligament of liquid fed by the reservoir at its originating end and breaking up into side-by-side substantially bichromal spheres at its distal end as shown in FIG. 4. As the substantially bichromal spheres continue in their flight, they harden and drop under the influence of gravity, and are finally collected.

It has been found that a 3 inch diameter disk shaped separator member 14 about 20 mils thick, rotated at about 2600 to 3000 rpm successfully produces substantially bichromal spheres about 4 mils in diameter. At slower rotational speeds larger spheres are produced while at higher rotational speeds smaller spheres are produced. It should be noted that at too high rotational speeds, the liquids come off their respective surfaces at the square edge without flowing together, resulting in smaller black and white monochrome spheres. Of course, it is known that suitable modifications may be made to the square edge to allow the liquids to flow together at higher speeds, e.g. rounding or tapering the edge.

Liquid flowing over the edge of the separator member 14 tends to form an outboard reservoir in the form of a ring of non-uniform diameter. This ring moves at the same speed as the separator member 14 and has circumferential protrusions, known as "Taylor instabilities", caused by the centrifugal force acting against surface tension. Initially, as the liquids form the reservoir, the protrusions or free jet 44 formed. As more material is fed into the reservoir, each free jet 44 starts to peak, and finally will release a large droplet of the liquid which is attached to the free jet 44. Finally, the large drop breaks away followed by smaller droplets. A relatively stable steady state condition then exists, with liquid being fed into the reservoir and into the free jet 44, and substantially uniform droplets being ejected into the host fluid from the distal ends of the ligaments. This inertial structure of spinning free jet 44 trailing the separator member 14 is held together by surface tension, which also causes their distal ends to be unstable and to break up into droplets. It is not necessary that the circumference of the separator member 14 be regular. In fact, a circumferential toothed structure will cause the "Taylor instabilities" and the resultant free jet 44 to be located coincident with each tooth. This allows a tailoring of the free jet 44 structure and some added control over the size of the substantially bichromal spheres.

As has been described above, the hardenable liquids 42, 44 are first deposited in the annular cups 20 associated with each surface 34, 36 and located in the body 16 of the separator member 14. The body thickness $t_1$ must be sufficient to accommodate the annular cups 20. Each annular cup will have an annular cup width w and depth d sufficient to receive suitable volumes of hardenable liquid material such that the hardenable liquid material may be spread evenly around the annular cup before it begins to flow out of the annular cup and along the surface of the separator member 14. However, if the entire separator member 14 had a body thickness $t_1$, the edge 38 would be too thick for the hardenable liquid streams to combine into a reservoir of liquid containing side-by-side streams of the hardenable liquid materials 34, 36. Therefore, the separator member 14 must taper into the nose 18 portion with a nose thickness $t_2$ which is small enough to ensure combining of the two streams of the hardenable liquid materials 34, 36 into a reservoir. For a 3 inch diameter disk shaped separator member 14 rotated at about 2600 to 3000 rpm a nose thickness $t_2$ between approximately 30 and 10 mils, preferably approximately 20 mils is desired. If the separator member is rotated at faster speeds, then a nose thickness $t_2$ of less is desired while if the separator member is rotated at slower speeds than a nose thickness $t_2$ which is greater may be tolerated. The exact shape and size of the separator member shown is for illustrative purposes only. It will be appreciated that many smooth tapering curves may be used and the exact size of the nose may vary so long as the edge of the separator member is sufficiently small such that the two hardenable flowing liquids can combine to form a reservoir. For instance, the body 16 is shown as tapering fairly quickly into the nose 18 which then extends radially outward. However, the body could taper into the nose 18 with a much reduced curve leading into an extremely short nose.

The hardenable liquids may be delivered to separator members in a heated, molten state. For example, if pigmented carnauba waxes are used then the waxes should be delivered at a temperature of about 120 degrees C. However if polyethylene is used then the polyethylene should be delivered at a temperature of about 240 degrees C. This is so that the hardenable liquids may flow freely and do not harden prematurely, i.e. long enough to prevent the free jet 44 from freezing. To guard against premature cooling a heating source 32 is placed in proximity to the separator member 14. Several types of heating sources 32 are suitable, for example, an induction heater, a radiant shroud heater or a clam-shell type heating structure surrounding the separator member 14 may all be used. While heating the separator member 14 is important to prevent premature hardening of the hardenable liquids, it must be noted that the heating should be confined to the area immediately surrounding the separator member 14 or hardening of the spheres may be delayed or prevented.

A significant decrease in yield of substantially hemispherical bichromal spheres can be caused due to a spiraling of one pigment into the other. This problem is attributed to cross winds, created by the spinning separator member 14, which distort the droplets as they leave the free jet 44. The stationary shrouds 22 and the rotating shrouds 24 prevent this problem, resulting in a greatly increased yield. The rotating shrouds 24 are mounted to the separator member 14 by rotating shroud support members 26, so that they are closely spaced from the surfaces of the separator member 14 and extend radially outwardly of the separator member 14. This causes the air between the shrouds to move as a unit with the spinning separator member 14, presenting relatively quiescent air moving with the free jet 44 and the substantially bichromal spheres. An example of the experimental dimensions of these elements is as follows: a 20 mil separator member 14, 3 inches in diameter has 5 inch diameter shroud discs spaced 90 mils apart, i.e. each is spaced of about 35 mils from its respective surface of the separator member 14. However, satisfactory results have also been obtained when the shroud discs are spaced 250 apart, i.e., each is spaced of about 125 mils from its respective surface of the separator member 14.

While it has been stated that the liquid material should not solidify prematurely, it is also understood that the substantially bichromal spheres should solidify as soon as possible after formation. Cooling may be accelerated by having the substantially bichromal spheres pass through a cooling zone. This has been accomplished experimentally by placing trays containing liquid nitrogen, beneath the spinning separator member 14 so that the substantially bichromal spheres move through the cold liquid nitrogen vapors shortly after being formed. This insures hardening at the appropriate location.

Figure 5:
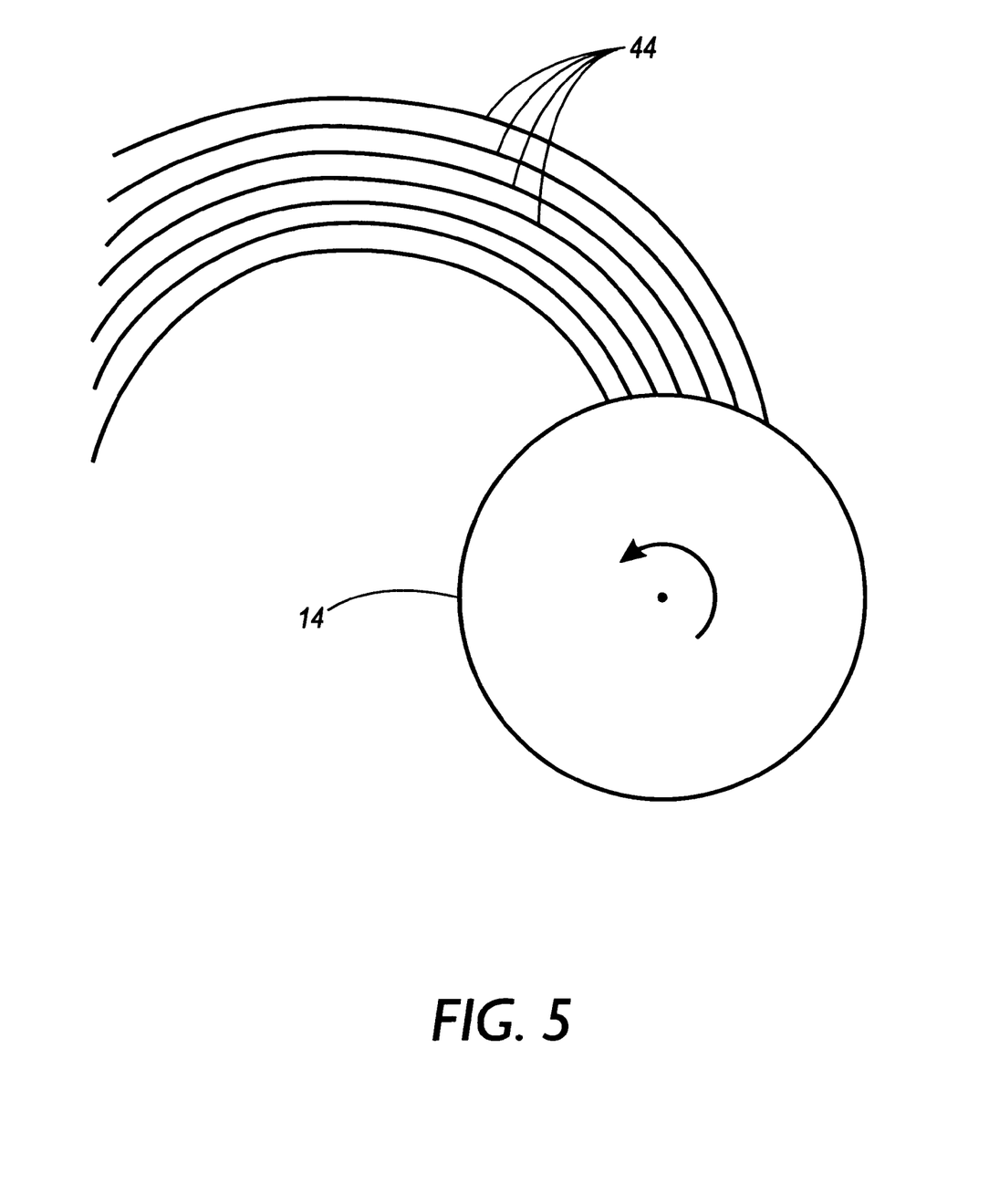
FIG. 5 is a top view of the spinner shown in FIG. 1 illustrating the formation of fine bichromal cylinders.

However, in an alternative use, high-viscosity hardenable liquids are used to create bichromal cylinders. If high-viscosity hardenable liquids are used the result is achieved as shown in FIG. 5. The free jet 44 formed by high-viscosity hardenable liquids do not break up into droplets but harden in place to form fine substantially cylindrical bichromal filaments. The filaments can then be aligned and separated into substantially bichromal cylinders.

What is claimed is:

1. An apparatus for fabricating bichromal elements comprising:

a) a separator member having a central rotating point comprising first and second spaced apart, opposed surfaces with an edge region in contact with both of said opposed surfaces, wherein the spacing between the opposed surfaces varies with the distance outwardly from the central rotating point such that the spacing is the largest at the central rotating point and the spacing decreases outwards from the central rotating point and the spacing is a minimum at the edge region, wherein each surface has a substantially annular cup for receiving a hardenable liquid spaced apart from and at least partially surrounding the central rotating point, the annular cup being of sufficient size to allow for substantially evenly spreading of a received hardenable liquid in the annular cup prior to the hardenable liquid spreading out of the annular cup b) nozzle apparatus for dispensing first and second differently colored hardenable liquids in the cups of the first and second surfaces, respectively, c) means for substantially uniformly spreading the liquid material in each of the annular cups located in the first and second surfaces, d) means for substantially uniformly spreading the liquid material from the cups over the first and second surfaces toward said edge region to form a reservoir containing side by side portions of the first and second liquid materials outboard of said edge region, and for forming ligaments from said reservoir.

2. The apparatus for fabricating bichromal elements of claim 1 wherein the means for substantially uniformly spreading the liquid material in the cups and over the first and second surfaces to form a reservoir of liquid from which ligaments are formed comprises a motor for spinning said separator member.

3. The apparatus for fabricating bichromal elements of claim 1 further comprising means for presenting quiescent air moving with the ligaments.

4. The apparatus for fabricating bichromal elements of claim 1 further comprising a pair of rotating shrouds for causing the air in between the shrouds to move as a unit with said separator member.

5. The apparatus for fabricating bichromal elements of claim 4 wherein the pair of rotating shrouds are moveable as a unit with said separator member, each shroud being spaced axially relative thereto and extending radially outwardly therefrom.

6. The apparatus for fabricating bichromal elements of claim 1 wherein the spacing of the first and second opposed surfaces at the edge region is sufficient to insure that the first and second differently colored liquids combine to form a reservoir.

7. The apparatus for fabricating bichromal elements of claim 1 wherein the spacing of the first and second opposed surfaces at the edge region is less than 30 mils.

8. The apparatus for fabricating bichromal elements of claim 7 wherein the spacing of the first and second opposed surfaces at the edge region is approximately 20 mils.

9. The apparatus for fabricating bichromal elements of claim 1 further comprising a heat source in the proximity of but separated from the separator member to prevent premature cooling of the first and second hardenable liquid by heating the area immediately surrounding the separator member.

10. The apparatus for fabricating bichromal elements of claim 9 wherein the heat source comprises an induction heater.

11. The apparatus for fabricating bichromal elements of claim 9 wherein the heat source comprises a radiant shroud heater.

12. The apparatus for fabricating bichromal elements of claim 9 wherein the heat source comprises a clam-shell heater.

13. The apparatus for fabricating bichromal elements of claim 1 wherein the nozzle apparatus for dispensing first and second differently colored hardenable liquids respectively includes controlling the dispensing rate of each stream.

14. The apparatus for fabricating bichromal elements of claim 1 wherein the means for substantially uniformly spreading the liquid material over the first and second surfaces toward said edge region to form a reservoir of liquid material outboard of said edge region, and for forming ligaments from said reservoir includes forming a reservoir of liquid material outboard of said edge region which is comprised of side-by-side regions of substantially equal portions of said first and second differently colored hardenable liquids.

15. The apparatus for fabricating bichromal elements of claim 1 further comprising means for causing the air within approximately 35 mils of a surface of said separator member to move as a unit with said separator member.

16. The apparatus for fabricating bichromal elements of claim 15 further comprising means for causing the air within approximately 35 mils of both surfaces of said separator member to move as a unit with said separator member.

17. The apparatus for fabricating bichromal elements of claim 1 further comprising means for causing the air within approximately 125 mils of a surface of said separator member to move as a unit with said separator member.

18. The apparatus for fabricating bichromal elements of claim 17 further comprising means for causing the air within approximately 125 mils of both surfaces of said separator member to move as a unit with said separator member.

19. The apparatus for fabricating bichromal elements of claim 1 further comprising at least one shroud spaced apart from a surface of the separator member for causing the air between the shroud and the associated surface of the separator member to move as a unit with said separator member.

20. The apparatus for fabricating bichromal elements of claim 19 wherein the shroud is spaced apart from the surface by approximately 35 mils.

21. The apparatus for fabricating bichromal elements of claim 19 wherein the shroud is spaced apart from the surface by approximately 125 mils.

22. The apparatus for fabricating bichromal elements of claim 19 further comprising at least two spaced apart shrouds with the separator member interposed therebetween for causing the air between the shrouds to move as a unit with said separator member.

23. The apparatus for fabricating bichromal elements of claim 22 wherein the two spaced apart shrouds are spaced apart approximately 90 mils.

24. The apparatus for fabricating bichromal elements of claim 22 wherein the two spaced part shrouds are spaced apart approximately 125 mils.

25. The apparatus for fabricating bichromal elements of claim 7 wherein the spacing of the first and second opposed surfaces at the edge region is approximately 10 mils.

26. The apparatus for fabricating bichromal elements of claim 1 wherein the annular cup substantially surrounds the central rotating point.

27. The apparatus for fabricating bichromal elements of claim 1 wherein the annular cup completely surrounds the central rotating point.

28. An apparatus for fabricating bichromal elements comprising:

a) a separator member having a central rotating point comprising first and second spaced apart, opposed surfaces with an edge region in contact with both of said opposed surfaces, wherein the spacing between the opposed surfaces varies with the distance outwardly from the central rotating point such that the spacing is the largest at the central rotating point and the spacing decreases outwards from the central rotating point and the spacing is a minimum at the edge region, wherein each surface has at least one cup so constructed and arranged for receiving a liquid material to be first dispensed into the cup and substantially evenly spread in the cup before being dispensed from the cup onto said surface and toward said edge region to form a reservoir of liquid material outboard of said edge region, b) nozzle apparatus for dispensing first and second differently colored hardenable liquids in the cups of the first and second surfaces, respectively, and c) means for spreading the liquid material in the cups located in the first and second surfaces, d) means for spreading the liquid material from the cups over the first and second surfaces toward said edge region to form a reservoir of liquid material outboard of said edge region having side by side portions of the first and second differently colored hardenable liquids, and for forming at least one ligament from said reservoir.

29. The apparatus for fabricating bichromal elements of claim 28 wherein the means for spreading the liquid material in the cups and the means for spreading the liquid material from the cups over the first and second surfaces to form a reservoir of liquid from which ligaments are formed comprises a motor for spinning said separator member.

30. The apparatus for fabricating bichromal elements of claim 28 further comprising means for presenting quiescent air moving with the ligaments.

31. The apparatus for fabricating bichromal elements of claim 28 further comprising a pair of rotating shrouds for causing the air in between the shrouds to move as a unit with said separator member.

32. The apparatus for fabricating bichromal elements of claim 28 wherein the spacing of the first and second opposed surfaces at the edge region is sufficient to insure that the first and second differently colored liquids combine to form a reservoir.

33. The apparatus for fabricating bichromal elements of claim 28 further comprising a heat source adjacent to but separated from the separator member to prevent premature cooling of the first and second hardenable liquids.

34. The apparatus for fabricating bichromal elements of claim 28 wherein the nozzle apparatus for dispensing first and second differently colored hardenable liquids respectively includes controlling the dispensing rate of each stream.

35. The apparatus for fabricating bichromal elements of claim 28 further comprising means for causing the air within at least approximately 35 mils of at least one surface of said separator member to move as a unit with said separator member.

36. The apparatus for fabricating bichromal elements of claim 35 further comprising means for causing the air within at least approximately 35 mils of both surfaces of said separator member to move as a unit with said separator member.

37. The apparatus for fabricating bichromal elements of claim 28 further comprising at least two spaced apart shrouds with the separator member interposed therebetween for causing the air between the shrouds to move as a unit with said separator member.

38. An apparatus for fabricating bichromal elements comprising:

a) a separator member having a central rotating point comprising first and second spaced apart, opposed surfaces with an edge region in contact with both of said opposed surfaces, wherein the spacing between the opposed surfaces varies with the distance outwardly from the central rotating point such that the spacing is the largest at the central rotating point and the spacing decreases outwards from the central rotating point and the spacing is a minimum at the edge region, wherein each surface has an annular cup for receiving a liquid of sufficient size such that any received liquid is substantially spread in the cup before the liquid is dispensed from the cup onto the surface of the separator member, the cup being spaced apart from and substantially surrounding the central rotating point, b) nozzle apparatus for dispensing first and second differently colored hardenable liquids in the cups of the first and second surfaces, respectively, and c) a motor for spinning the separator member and spreading the liquid material in the annular cups located in the first and second surfaces, for spreading the liquid material from the cups over the first and second surfaces toward said edge region to form a reservoir of liquid material outboard of said edge region, and for forming ligaments from said reservoir.

39. The apparatus for fabricating bichromal elements of claim 38 further comprising a pair of rotating shrouds for causing the air in between the shrouds to move as a unit with said separator member.

40. The apparatus for fabricating bichromal elements of claim 39 wherein the pair of rotating shrouds are moveable as a unit with said separator member, each shroud being spaced axially relative thereto and extending radially outwardly therefrom.

41. The apparatus for fabricating bichromal elements of claim 38 further comprising a heat source adjacent to but separated from the separator member to prevent premature cooling of the first and second hardenable liquids.

42. The apparatus for fabricating bichromal elements of claim 38 wherein the apparatus for dispensing first and second differently colored hardenable liquids respectively includes controlling the dispensing rate of each stream.

* * * * *